United States Patent [19]
Argyle et al.
[11] 3,842,407
[45] Oct. 15, 1974

[54] INDUCTIVE SENSOR FOR MAGNETIC BUBBLE DOMAIN DETECTION

[75] Inventors: Bernell E. Argyle, Putnam Valley; Thomas H. DiStefano, Chappaqua, both of N.Y.

[73] Assignee: International Business Machines Corporation, Armonk, N.Y.

[22] Filed: June 30, 1972

[21] Appl. No.: 267,877

[52] U.S. Cl. .................. 340/174 TF, 340/174 PM, 340/174 QA, 340/174 RF, 340/174 YC
[51] Int. Cl. .......................................... G11c 11/14
[58] Field of Search .............................. 340/174 TF

[56] References Cited
UNITED STATES PATENTS
3,523,286 8/1970 Bobeck et al. ............... 340/174 TF
OTHER PUBLICATIONS
IBM Technical Disclosure Bulletin, Vol. 13, No. 10, March 1971, pp. 3064–3065.

*Primary Examiner*—James W. Moffitt
*Attorney, Agent, or Firm*—Jackson E. Stanland

[57] ABSTRACT

A sensor for detection of magnetic bubble domains in which the domains are oscillated in size to cause a change in a detector coupled to the domains. In one embodiment, the oscillator is a conductor loop driven by an electrical source to oscillate a domain therein, and the detector is a circuit connected to the conductor loop and responsive to the change in self-inductance of the loop, due to a difference in the amount of magnetic flux coupling the loop as the domain oscillates. Another embodiment uses the change in capacitance between conducting plates as an indication of the presence of a domain. Still another embodiment uses the change in amount of light passing through an oscillating domain as an indication of the presence of a domain.

15 Claims, 9 Drawing Figures

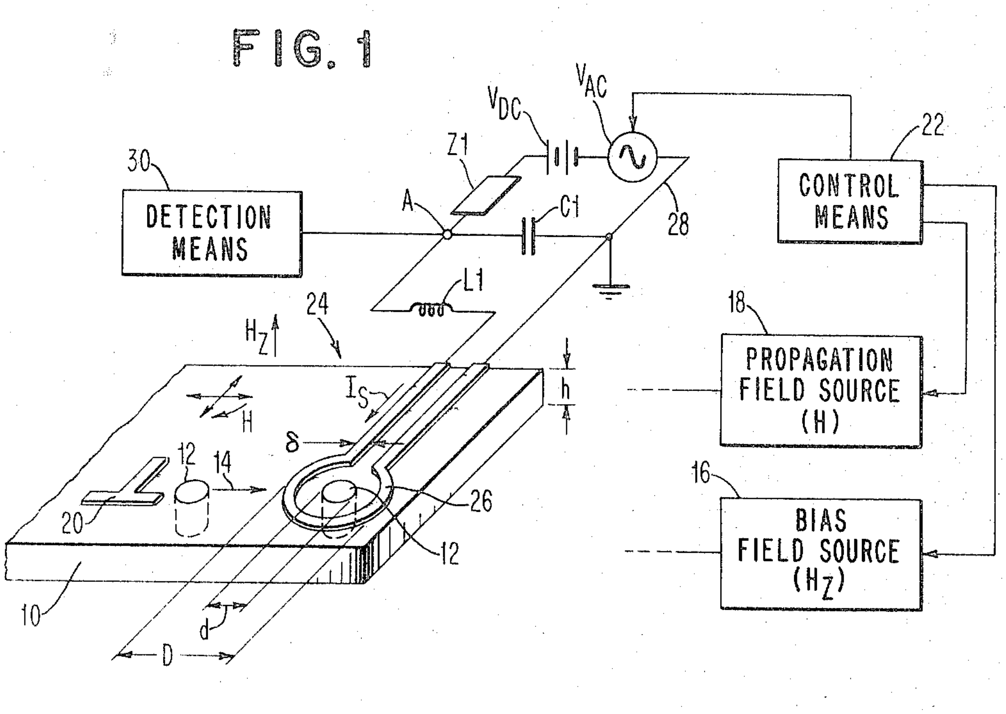
FIG. 2
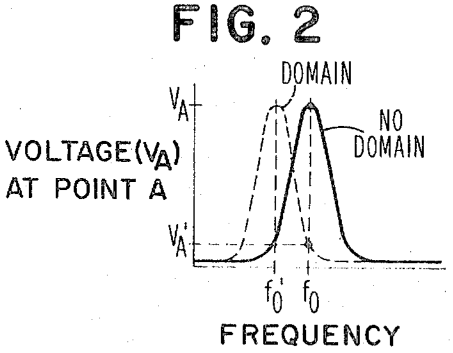
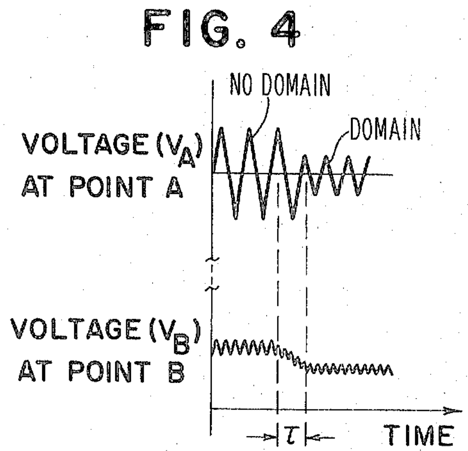
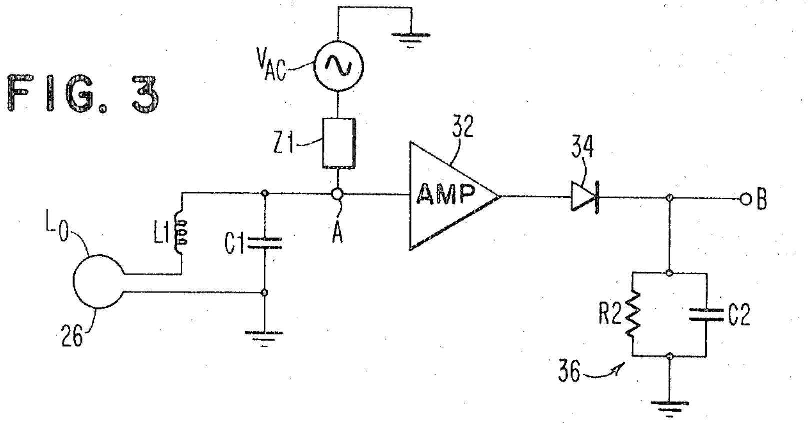

INDUCTIVE SENSOR FOR MAGNETIC BUBBLE DOMAIN DETECTION

BACKGROUND OF THE INVENTION

1. Field of the Invention

This invention relates to sensing means for detection of magnetic bubble domains, and more particularly to a sensing means which is capable of non-destructive detection of submicron diameter bubble domains.

2. Description of the Prior Art

Many sensing techniques are known for detection of magnetic bubble domains. These detection means generally rely upon the influence on the detecting element of the stray magnetic field due to the bubble domain. For instance, a sense loop comprising a conductor is shown for detection of domains in U.S. Pat. No. 3,460,116. The change in magnetic flux linking the sense conductor while a domain passes below it provides the output signal in a known way.

Another type of bubble domain sensing means uses magneto-optic readout, as shown in U.S. Pat. No. 3,515,456. This type of sensing relies upon the fact that the bubble domain has a magnetization which is opposite to that of the rest of the magnetic sheet. Consequently, the polarization of an input light beam will be rotated differently when the beam passes through a portion of the magnetic sheet containing a bubble domain then when it passes through a portion of the magnetic sheet where a bubble domain is not present. This is the Kerr or Faraday effect which is used to indicate the presence and absence of magnetic domains in selected locations of the magnetic sheet.

A four terminal sensor for magnetic bubble domains using the Hall effect is shown in U.S. Pat. No. 3,609,720. This type of sensing requires additional input leads and will not easily detect ultra-small domains.

The most suitable bubble domain sensing technique discovered thus far is that which relies upon the magnetoresistive effect. A magnetoresistive sensing element is located in flux coupling proximity to a magnetic domain. When the stray field of the domain intercepts the sensing element, the resistance of the element will change and this is detected as either a current or a voltage change. This type of sensing offers the advantages of easy fabrication, integration into the propagation circuitry used to move the domains, and high signal-to-noise ratios. Magnetoresistive sensing is described in more detail in an article by G. S. Almasi et al., appearing in the Journal of Applied Physics, Vol. 42, No. 4, Page 1268, (1971).

As the development of magnetic bubble domain technology continues, the size of the domains is being decreased to increase storage density. The magnetic field associated with small domains are very small and detection of such domains is difficult. For instance, detection of submicron domains is a future problem which may be a difficult obstacle to one faced with the design of very high density bubble domain systems. The prior art has not addressed the detection of very small domains, except for various schemes which have been presented using magnetoresistive sensing. For instance, one such scheme involves the use of a second magnetoresistive sensor, series-connected with the first sensor, which is not in flux-coupling proximity to the bubble domains to be detected. Noise compensation is achieved by this means in order to enhance the signals from the domain to be sensed. This noise cancellation means is shown in copending application, Ser. No. 192,547, filed Oct. 26, 1971 and now U.S. Pat. No. 3,736,419 and assigned to the present assignee.

Another magnetoresistive sensing scheme designed to detect small bubble domains is that in which the uniaxial anisotropy field and shape anisotropy field of the magnetoresistive sensing element are at right angles with one another, the smaller of these fields being aligned with the direction of the magnetic field from the domain. Such a detection means is described in copending application, Ser. No. 193,904, filed Oct. 26, 1971 and now U.S. Pat. No. 3,716,981 and assigned to the present assignee.

In order to provide a domain sensing device having significantly increased sensitivity for detection of bubble domains, applicants have discovered that oscillations of domain size will provide significant changes in a detection means coupled to the oscillating domain. Generally, the domain oscillations are provided by a conductor loop surrounding a domain, but any other oscillation means can also be used.

The present invention is distinguished from the conductor loop sensing technique of U.S. Pat. No. 3,508,222 in many ways. For instance, that patent teaches a sensing device which relies on the change in magnetic flux with time across a sensing loop in which a voltage is induced. In the present invention, the oscillation of domain size is used to change a fundamental parameter of the detection circuitry. For instance, changes in AC inductance and capacitance are used in the present invention.

As another distinguishing feature, the output signal developed in U.S. Pat. No. 3,508,222 is less than the output signal developed in accordance with the present invention. In U.S. Pat. No. 3,508,222, an induced voltage is measured across a sense loop, in contrast with the present invention where a voltage is sensed across a tank circuit which is part of the detection means. Further, the domain propagates past a conductor loop in the prior art, and oscillates in a conductor loop in the present invention. The time of the domain oscillation is much less than the propagation time past a loop, hence larger output signals are developed in the present invention.

Another point of distinction is that the present invention takes advantage of the fact that the bubble domain response at a particular frequency is greater than it is at DC. Because an AC quantity (such as inductance) is measured in the present detection scheme, a designer has the freedom to choose the frequency of domain oscillation such that the magnetic domain response is enhanced by the free resonance of the bubble domain itself. This leads to large output signals.

Accordingly, it is a primary object of this invention to provide an ultra-sensitive detector of magnetic bubble domains.

It is another object of this invention to provide a sensing device for detection of magnetic bubble domains which have submicron diameters.

It is still another object of this invention to provide a sensing means for detection of magnetic bubble domains which can be easily fabricated as a very small detector.

It is a further object of this invention to provide a compact detector for sensing of very small bubble domains which is capable of high packing density for use in high density bubble domain systems.

BRIEF SUMMARY OF THE INVENTION

A magnetic sheet in which bubble domains exist has located adjacent thereto a means for oscillating the size of a bubble domain. This oscillation means can be, for instance, a conductor loop in which the domain to be oscillated is located. Domains can be propagated to the conductor loop or can be nucleated in the area of the conductor loop.

An AC current in the conductor loop will create a magnetic field within the loop which causes the domain to expand and contract in size. If desired, a DC current can be passed through the conductor loop in order to initially stabilize the size of the domain so that all of its stray magnetic field will couple to the conductor loop.

Oscillation of the domain size by an AC current in the conductor loop changes a parameter of the detection means coupled to the domain. For instance, a change in size of the domain will cause a change in AC inductance of the conductor loop. This will cause voltage and frequency changes in a resonant circuit coupled to the conductor loop.

The detection means is responsive to a parameter which changes as the size of the magnetic domain changes during each oscillation. In addition to changes in AC inductance of the sense loop caused by a change in flux-coupling the sense loop, a change in capacitance of conductor plates located on both sides of the magnetic sheet can also be used. This will cause frequency and voltage changes in a resonant circuit of the type used when changes in inductance are measured.

Another embodiment utilizes a change in light passing through the domain as it oscillates. For instance, the amount of light scattered will depend upon the oscillation of the domains. Domain oscillation will also cause a change in the amount of light detected when the Faraday or Kerr effect is used.

The response of the detection circuit indicates the change in size of the bubble domain. In addition, there is energy dissipation due to the motion of the bubble domain wall which will affect the response of the detection means. For instance, energy dissipation can cause a lowering of the response of a resonant circuit which leads to a decrease in peak response of the circuit.

Accordingly, in its broadest form the invention comprises a means for oscillating the size of a domain and a detection means responsive to the domain size having a parameter that changes in accordance with the size of the domain. Changing the domain size changes that parameter which in turn changes a quantity which can be measured and indicated by the detection means.

These and other objects, features, and advantages will be more apparent in the following more particular description of the preferred embodiments.

BRIEF DESCRIPTION OF THE DRAWINGS

FIG. 1 is a schematic representation of a sensing apparatus which relies upon the change in inductance of a sense loop (oscillation means) due to the presence and absence of magnetic bubble domains in the loop.

FIG. 2 is a graph of voltage versus frequency for the sensing apparatus of FIG. 1, indicating the frequency and voltage changes which are indicative of the presence and absence of magnetic bubble domains.

FIG. 3 is a circuit diagram of a suitable detection circuit for use in the apparatus of FIG. 1.

FIG. 4 is a plot of voltages at two terminals in the circuit of FIG. 3, indicating the change in voltage which occurs due to the presence and absence of magnetic bubble domains in the oscillation means.

DETAILED DESCRIPTION OF THE PREFERRED EMBODIMENTS

Figure 5:
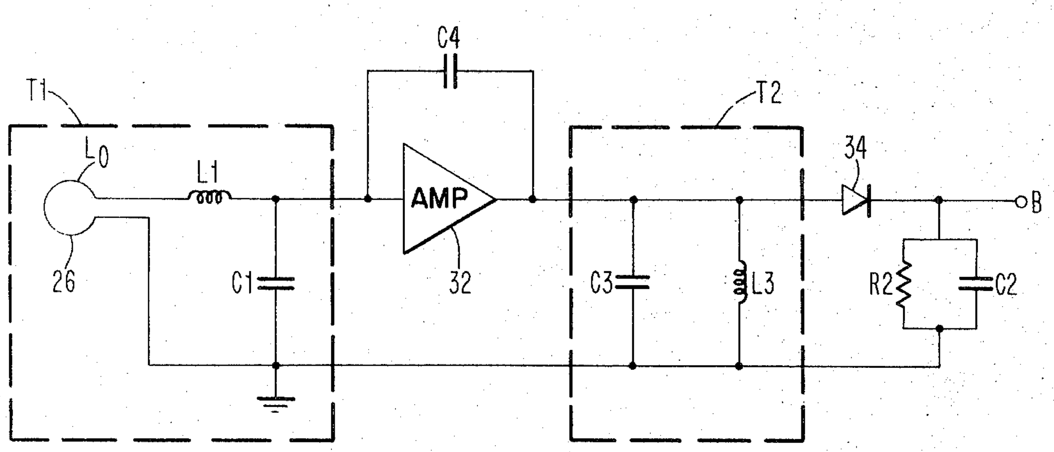
FIG. 5 is an alternate embodiment for the detection circuitry used in the sensing apparatus of FIG. 1.

FIG. 1 is a schematic illustration of a sensing apparatus in accordance with the present invention. A magnetic sheet 10, such as a garnet film or an orthoferrite film or platelet, has magnetic bubble domains 12 located therein. These domains can be nucleated anywhere within magnetic sheet 10 or can be propagated in the magnetic sheet, as indicated by the arrow 14.

A bias field source 16 provides a magnetic bias field $H_z$ for stabilizing the size of domain 12 in sheet 10. The bias field source can be a coil surrounding sheet 10, a permanent magnet layer, or a magnetic film exchange coupled to magnetic sheet 10, all of which are well known in the art. Additionally, propagation of domains 12 in sheet 10 is provided by way of the known propagation means, including conductor loops, permalloy patterns, etc. For instance, a propagation field source 18 is used to provide a propagation field H which is a reorienting magnetic field in the plane of magnetic sheet 10. Magnetic field H is used to create attractive magnetic poles in successive positions along the direction of propagation in sheet 10, as is well known. In FIG. 1, only one of these permalloy patterns 20 is illustrated, for ease of drawing. A control means 22 provides clock pulses to field sources 16 and 18 to trigger these sources for provision of the necessary fields.

Located adjacent magnetic sheet 10 is a sensing apparatus generally indicated by the numeral 24. Sensing apparatus 24 comprises an oscillation means 26, which is conveniently a conducting loop as shown in FIG. 1. Apparatus 24 also includes associated circuitry 28 for provision of a tickling current $I_\omega$ in loop 26 for oscillation of size of a domain located in loop 26.

Circuitry 28 generally includes inductance L1, a capacitance C1, a current limiting impedance Z1, a DC voltage source $V_{DC}$ (optional), and an AC voltage source $V_{AC}$. $V_{AC}$ may be triggered by a control pulse from control means 22, if desired. These two sources provide current $I_s$ in loop 26. Inductance L1 is added to the circuitry in order to lower the resonant frequency of the circuit to more suitable values. Z1 is preferably an inductance, so the tank circuit comprising L1 and C1 will not be loaded when a domain is oscillated in loop 26. Voltage source $V_{AC}$ provides RF voltages and frequencies generally in the range 1–100 megacycles. The frequency response of the domain depends upon the bubble domain material and the frequency of $V_{AC}$ is generally chosen to be a frequency to which the bubble domain diameter will respond efficiently (for example, near the resonance frequency of the bubble domain). Operation at as high a frequency as possible (at which the domain will respond) is preferable. Source $V_{DC}$ is used to adjust the size of the domain within loop 26 to be such that all of the stray magnetic field of the domain will couple to the loop even in the absence of AC current . That is, when the domain diameter is about equal to the size of loop 26, maximum sensitivity results.

A detection means 30 is connected at terminal A and provides an indication of the presence and absence of domains 12 in sense loop 26, by being responsive to the change in AC inductance of loop 26 when domains are present and absent in loop 26.

In operation, a domain 12 located in loop 26 has its diameter expanded and contracted by AC current $I_\omega$ flowing through loop 26 due to applied voltage $V_{AC}$. $I_s = I_\omega + I_{DC}$, where $I_{DC}$ is the DC current due to $V_{DC}$. Since the domain 12 oscillates in diameter, the magnetic flux from the domain which couples sense loop 26 will oscillate in value. This will cause a change in AC inductance of loop 26 which will cause a frequency change in the associated circuitry 28. This frequency change is detected by detection means 30, indicating that a domain 12 is present in sense loop 26.

Operation of the circuit of FIG. 1 is more fully explained with reference to FIG. 2. This figure plots the voltage $V_A$ at terminal A as a function of the frequency of resonant circuit 28. The solid line is the resonant curve for the circuitry when no domain is present in sense loop 26. This curve has a peak resonance at frequency $f_0$ given by the following expression.

$$f_0 = 1/2\pi \sqrt{1/(L_0 + LI)C1} \qquad (1)$$

where $L_0$ is the inductance of sense loop 26;
$L1$ is the inductance of coil L1; and
$C1$ is the capacitance of capacitor C1.

When a domain is present in sense loop 26, the magnetic flux linking this loop will change. This in turn will change the resonant frequency of circuit 28 to a new value $f'_0$ different from $f_0$. An AC current $I_\omega$ flowing through loop 26 will produce a magnetic field which alternately adds to and subtracts from the bias field $H_z$ on a domain within sense loop 26. This in turn will cause a change in AC inductance of loop 26 due to a difference in magnetic flux coupling that loop. Thus, the value of inductance $L_0$ changes to $L'_0 = L_0 + \Delta L_0$. When this new value of inductance is inserted in Equation 1, it is apparent that a new frequency $f'_0 < f_0$ will result.

The dashed curve in FIG. 2 indicates the frequency change in circuit 28 when a domain is present in sense loop 26. From this plot, it is apparent that either a frequency change (at a fixed voltage) can be detected by detection means 30, or a voltage change (at a fixed frequency) can be detected by means 30. For instance, if measurements are to be made at a fixed frequency $f_0$, the voltage $V_A$ at terminal A will change from a value $V_A$ to a value $V_A$, when a domain is present in loop 26. Similarly, if measurements are to be made at a fixed voltage $V_A$, detection means 30 will see a difference in frequency $f_0 - f'_0$ as a result of a domain 12 moving into sense loop 26.

Although the curves of FIG. 2 are shown having the same shape and merely shifted with respect to one another, it may be that the response of the resonant circuit will be lowered when a domain is present in loop 26, due to some amount of energy loss in the domain wall displacement. In this case the dashed curve will have a peak voltage less than $V_A$, in addition to being shifted with respect to the solid curve.

FIG. 3

FIG. 3 shows a circuit which can be used to provide detection of domains in the apparatus of FIG. 1. This circuitry comprises a conventional AC amplifier 32, detector (diode) 34, and an optional noise filter (R2, C2) designated by numeral 36. The other components in FIG. 3 are the same as those shown in FIG. 1.

Amplifier 32 amplifies the voltage appearing at terminal A while detector 34 acts as a rectifier and filter, while circuitry 36 acts to minimize the voltage fluctuations in the output signal at frequency $f_0$.

The values of inductance L1 and capacitance C1 are chosen initially depending upon the bubble domain size, bubble domain material, etc. Once the circuit is established, no further changes are required. The AC frequency of the circuit is determined by the values of loop inductance $L_0$, inductance L1, and capacitance C1. Variations from this frequency due to the presence of a bubble in loop 26 are detected as voltage changes at terminals A and B.

Filter 36 is comprised of resistor R2 and capacitor C2. As will be apparent when reference is made to FIG. 4, this filter serves to remove residual noise at frequency $f_0$. Filter 36, while reducing noise, introduces a time constant $\tau$ = (R2)(C2). However, this time constant can be made quite small.

FIG. 4

FIG. 4 is a plot of the voltage $V_A$ appearing at terminal A and $V_B$ appearing at terminal B, plotted as a function of time. From this plot, it can be seen that voltage $V_A$ has a larger amplitude when a domain is not present in loop 26 then when a domain is present in loop 26. Voltage $V_B$ has a smoother contour because of the action of noise filter 36. However, the time constant $\tau$ = (R2)(C2) delays the determination of the difference in voltage levels when measurements are made at terminal B.

FIG. 5

FIG. 5 shows another circuit for detection of the change of inductance in sense loop 26 depending upon the presence and absence of a domain in the sense loop. FIG. 5 will be recognized by those of skill in the art as a Miller oscillator circuit coupled to the resonant circuit shown in a portion of FIG. 1. Such a circuit is more fully described on page 410 of a text entitled "Radio Engineering," by F. E. Terman, published by McGraw-Hill Book Company, Inc., third Edition (1947). In the circuit of FIG. 5, two tank circuits T1 and T2 are used. Tank circuit T1 is comprised of inductances $L_0$ and L1, plus capacitance C1. Tank circuit T2 is comprised of inductance L3 and capacitance C3. Diode 34 and noise filter 36 are the same as were used in FIG. 3. Capacitance C4 provides phase adjustment in the feedback circuit connected to amplifier 32.

The circuit of FIG. 5 will oscillate only if both tank circuits T1 and T2 have the same resonant frequency. The circuit is initially set up so that tank circuits T1 and T2 have the same resonant frequency without a domain being present in sense loop 26. This will cause an oscillation to develop and a voltage $V_B$ will develop at terminal B. When a domain is present in sense loop 26, the tank circuits T1, T2 will no longer be tuned to a common frequency and a lesser voltage will be obtained at terminal B, indicating the presence of a domain in sense loop 26.

Fabrication

Sensing apparatus 24 comprised of an inductive sensing loop 26 and the associated circuitry 28 is easily provided by standard techniques. For instance, loop 26 is comprised of a conductor which is deposited as a strip line directly on magnetic sheet 10, or on a thin layer of insulation which is uniformly deposited on sheet 10. Loop 26 has a diameter D which is larger than the diameter d of the bubble domain 12. Oscillation of the bubble domains 12 is between diameters corresponding to domain collapse and domain run-out, and the diameter of loop 26 is adjusted accordingly. As an example, loop 26 may have a diameter D of 7$\mu$m on garnet bubble domain films of about 6–12$\mu$m thickness.

Components L1 and C1 can be deposited directly on the magnetic sheet 10 as integrated circuits, if desired. They can also be part of the external circuitry.

Example

A representative example used to describe the operation of this sensing means is explained with reference to FIG. 6. This figure is a plot of the magnetic flux $\Phi$ linking sense loop 26 as a function of the total magnetic field exerted on a domain 12 within the sense loop 26. This curve is indicated by the line labelled $\Phi$.

The diameter d of a domain in sense loop 26 is also plotted against the total magnetic field exerted on the domain. The domain diameter $d_0$ is the diameter of the domain when there is no AC magnetic field exerted on it. That is, $d_0$ is the domain diameter for the total magnetic field $H_z$ (bias field) on the domain.

As the magnetic field exerted on the domain varies, the diameter of the domain varies along curve *d*. The preferred operating region of magnetic fields falls between the critical points of stability for the domain, i.e., between elliptical instability (run-out) and radial instability (collapse). In a preferred operation, the swing of the AC magnetic field due to current in the sense loop is such as to expand and contact the domain diameter without bringing the diameter into the collapse or run-out regions. For instance, in FIG. 6, the domain diameter would be varied between 1.7$\mu$m and 4.4$\mu$m.

Let the domain diameter *d* be somewhat smaller than the sense loop diameter D, so that $$A \gtrsim a \tag{2}$$

where $D$ = loop diameter
$A = \pi D^2/4$
$d$ = domain diameter
$a = \pi d^2/4$.

The magnetic field in the center of loop 26 due to current $I_\omega$ in loop 26 is nearly uniform and has a value of $$H_{AC} = 4\pi I_\omega / D \tag{3}$$

where $I_\omega$ is the AC tickling current
$H_{AC}$ is the AC magnetic field intensity in loop 26.

$I_s$ and $H_{AC}$ are limited by the operating range of the bubble diameter between the collapse diameter and the diameter near the state of the elliptical instability (run-out). Thus, if $H_z$ is the DC bias field applied to the film externally in order to stabilize the domains at diameters $d_0$ in the range between collapse and run-out, $H_{AC}$ is limited according to $$H_{AC} \lesssim H_z - H\text{ (run-out)}$$
$$H_{AC} \gtrsim H\text{ (collapse)} - H_z \tag{4}$$

Additionally, source $V_{AC}$ can be used to provide a current $I_{AC}$ which will combine with $H_z$ in the sense loop 26.

In response to $H_{AC}$, the domain diameter fluctuates about the equilibrium value $d_0$. From FIG. 6,

$$d \approx d_0 + \delta d / \delta H_{AC} \cdot \Delta H_{AC} = d_0 - 1.0\times10^{-5}\, H_{AC} \tag{5}$$

Figure 6:
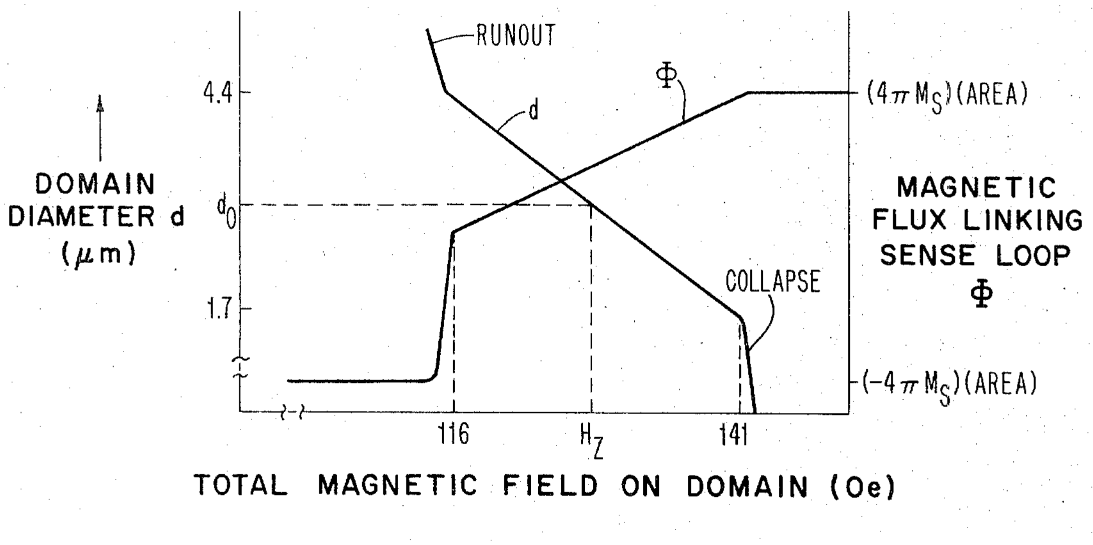
FIG. 6 is a plot of domain diameter (*d*) and magnetic flux ($\Phi$) linking the sense loop plotted as a function of the total magnetic field exerted on domains within the sense loop of FIG. 1.

The quantity $\delta d / \delta H_{AC}$ is obtained from FIG. 6 for this particular sample. That is, the slope of the curve labelled *d* is 0.1$\mu$m/Oe. for a typical garnet material (such as $Gd_{0.2}Y_{2.8}Ga_1Fe_4O_{12}$). The change in area of the bubble domain with changing magnetic field $H_{AC}$ is given by Equation 6.

$$\delta a / \delta H_{AC} = 5\times10^{-6}\pi\, d_0 \tag{6}$$

The amplitude of the bubble domain oscillation is $$\Delta a = 2\times10^{-4}\pi^2\, I_\omega\, d_0/D \tag{7}$$

The change in bubble domain diameter leads to a contribution to the inductance of sense loop 26 which is given by the following expression 8.

$$\Delta L_0 = 8\pi M_s\, \Delta a / I_\omega = 4\pi^2\times10^{-4}\,(4\pi M_s)\, d_0/D \tag{8}$$

where $M_s$ is the saturation magnetization of magnetic sheet 10. The inductance of sense loop 26 without a domain 12 present therein is given by the following expression which is determined by the geometry of the loop. In the simple case where the width and thickness of the conduction loop are approximately equal and $\delta << D$, $$L_0 \approx 2\pi\mu_s D\,(\ln 8D/\delta - 1.75) \tag{9}$$

where $\mu_s$ is the permeability of magnetic sheet 10;
$\delta$ is the width of the conductor of loop 26.

Typically, $\mu_s \approx 1$ for a saturated magnetic film. Taking the reasonable case $\delta = D/6$ for the loop 26, $$L_0 = 0.97\ (4\pi D) \quad (10)$$

and, $$\Delta L_0/L_0 = 1.03\times10^{-5}\pi d/D^2\ (4\pi M_s) \quad (11)$$

For a typical garnet film $4\pi M_s$ is about 215 gauss. For a reasonable geometry $D \approx 1.5d$ so that $$\Delta L_0/L_0 \approx 10 \quad (12)$$

Thus, the inductance of the loop sensor 26 will increase by an order of magnitude which leads to a large frequency and voltage change in the detection circuitry.

Typical values for the AC drive and sense circuits are the following:

$$f_0 \approx 25 \text{ MHz}$$
$$L_0 \approx 10^{-11} \text{ henries}$$
$$L1 \approx 2.5\times10^{-9} \text{ henries}$$
$$C1 \approx 0.016\ \mu F$$
$$f_0 - f'_0 = 1/2\ (\Delta L/L1 + L_0)\, f_0$$
$$\approx 1/2\ (10L_0/L1)\, f_0$$
$$= 0.5 \text{ MHz}$$

FIG. 7

Figure 7:
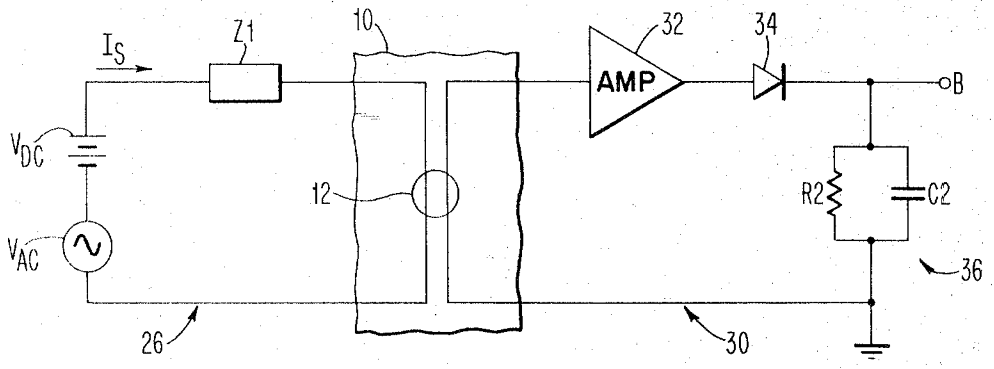
FIG. 7 is a schematic representation of a sensing device in which the detection means is separate from the oscillation means.

FIG. 7 shows an embodiment for a domain sensing device in which the oscillation means is separate from the detection means. To the extent possible, the same reference numerals will be used as were used in the previous embodiment.

In FIG. 7, the oscillation means is generally designated by numeral 26, while the detection means is generally designated by numeral 30. Bubble domains 12 are brought to a position where an AC tickling current through oscillation means 26 causes the size and/or shape of the domains to oscillate. The oscillating domain couples together the oscillation circuit 26 and detection circuit 30.

In the same manner as was discussed previously with respect to FIG. 3, the voltages induced in detection means 30 are amplified by amplifier 32 and detected by diode 34 to produce a voltage at terminal B which depends upon the presence of a domain 12 in a position to be acted upon by current in oscillation means 26. The noise filter 36 smooths the contour of the voltage signal at terminal B.

Oscillation of the domain 12 by means 26 is not a radial mode oscillation as was previously used. However, the mode of oscillation is not critical and any mode of domain size/shape oscillation may be utilized.

FIG. 8

Figure 8:
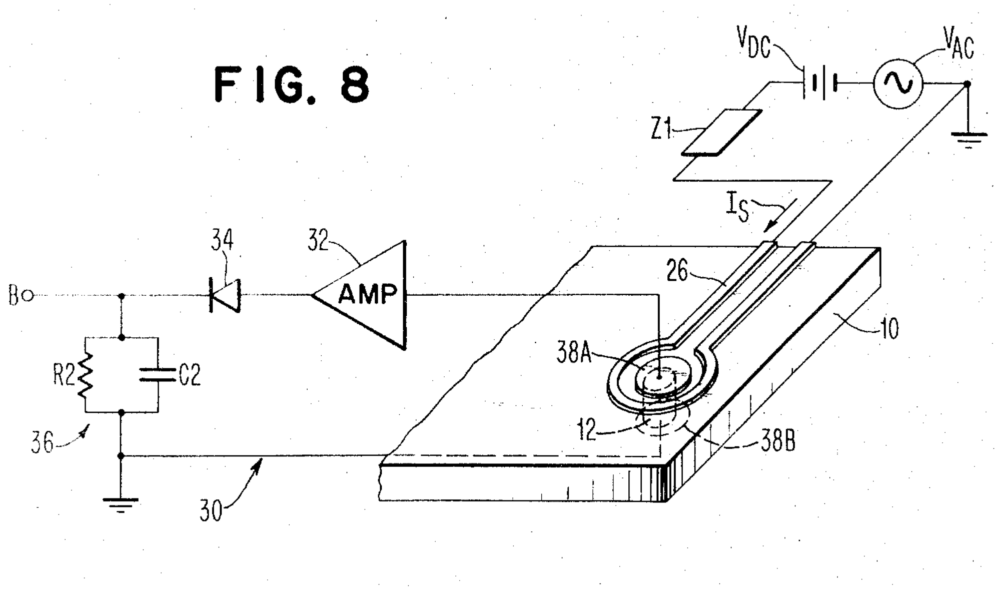
FIG. 8 is a schematic representation of a domain sensing device in which the detection means is responsive to the change in capacitance of a circuit coupled to the magnetic domains, for indicating the presence and absence of domains in the oscillation means.

FIG. 8 shows an embodiment in which capacitive potential is the parameter that is changed to provide an indication in the detection means 30 of the presence of a bubble domain 12 in the oscillation means 26.

The oscillation means 26 is comprised of a conductor loop as was used previously. Connected to the loop 26 is an AC source $V_{AC}$ and a DC source $V_{DC}$, together with an impedance Z1. The functions of these components are identicl to their functions in the other embodiments.

The detection means 30 generally comprises conducting plates 38A and 38B located on the top and bottom surfaces of magnetic sheet 10, respectively. The rest of the detection means 30 is comprised of the same elements as were previously used, namely AC amplifier 32, diode detector 34, and noise filter 36.

In operation, the oscillating domain causes a voltage to be induced in the capacitor formed by plates 38A and 38B. This voltage is amplified by amplifier 32 and detected by diode 34. Therefore, the voltage at terminal B is indicative of the presence and absence of a bubble domain 12 in oscillation means 26, as is illustrated in FIG. 4.

The development of a voltage between the capacitor plates 28A and 38B depends upon the work functions at the top and bottom surfaces of magnetic sheet 10. When these work functions are different a voltage is induced in the plates 38A and 38B when the area of the magnetic bubble is oscillated. Generally, magnetic sheet 10 is a material which does not have an inversion symmetry of the crystal lattice in order to provide the voltage which serves as an indication of the presence and absence of domains in oscillation mans 26.

FIG. 9

Figure 9:
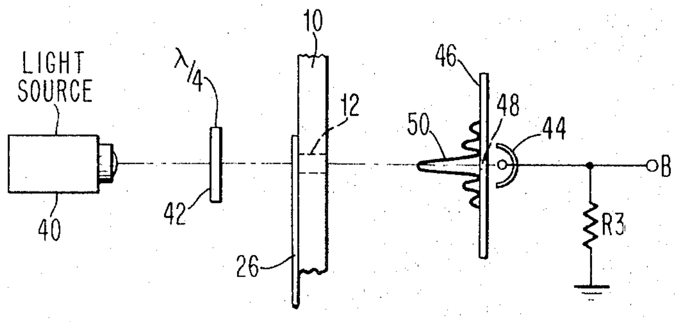
FIG. 9 is a schematic representation of a domain detection device in which an optical detection means is used together with the domain oscillation means.

In FIG. 9, a light source is used to provide an indication of the presence and absence of a bubble domain 12 in the oscillation means 26. In more detail, light source 40, such as a helium-neon laser, provides a light beam which passes through a quarter-wave plate 42 before striking magnetic sheet 10. This light beam is circularly polarized when it strikes magnetic sheet 10, and will pass through this sheet to impinge on a photocell 44 which is located behind a plate 46 having an aperture 48 therein. Light striking photocell 44 will produce an electrical current and passage of this current through resistor R3 will produce a voltage at terminal B indicative of the presence and absence of a domain 12 magnetically coupled to oscillation means 26. The light spectrum scattered from magnetic sheet 10 is indicated by the curve 50 in front of plate 46.

In operation, light is scattered in passing through magnetic sheet 10 and the intensity of scattered light reaching photocell 44 changes due to the oscillation of the size of a domain 12 beneath oscillation means 26. Therefore, the amount of voltage developed in terminal B is an indication of the presence and absence of a domain 12 beneath oscillation means 16.

Of course, the Kerr or Faraday effect can be used to detect oscillating domains using the apparatus of FIG. 9. In this case, linearly polarized light is used so that a polarizer would be placed in front of magnetic sheet 10 and an analyzer behind this sheet, in a known manner.

SUMMARY

What has been described is a bubble domain sensing apparatus using an oscillation means to change the size and/or shape of domains in a magnetic sheet and a detection means which is responsive to the change in domain size. Generally, a parameter influencing the operation of the detection means is changed when the domain size and/or shape changes, and this is ultimately indicated as a current or voltage change. The oscillation means and the detection means need not be comprised of the same apparatus and various parameters can be used to indicate the presence and absence of a domain. This apparatus provides very high sensitivity regardless of bubble domain size and is easily fabricated directly on the magnetic chip (or on an insulating layer over the magnetic chip) using known fabrication techniques. Further, the size of the oscillation means and its shape are arbitrary. It should be understood by those skilled in the art that other parameters associated with an oscillating domain can be used to provide an indication of the presence and absence of the domain.

What is claimed is:

1. An apparatus for detecting magnetic bubble domains in a magnetic medium, comprising:

resonant means coupled to said domains which has first and second values depending upon the amount of magnetic flux coupled thereto, and detection means coupled to said resonant means for detecting said first and second values.

2. The apparatus of claim 1, where said resonant means includes an inductance whose value is changed by said oscillating domain when the magnetic field of the domain is coupled to said detection means.

3. An apparatus using magnetic bubble domains in a magnetic medium, comprising:

oscillation means for alternately decreasing and increasing the size of a magnetic bubble domain, detection means for sensing said domain, said detection means being coupled to said domain whose size is changed by said oscillation means.

4. The apparatus of claim 3, where said oscillation means includes a conductor and a current source for producing an oscillating current in said conductor, the magnetic field established by said oscillating current coupling to said domain.

5. An apparatus for detecting magnetic bubble domains in a magnetic medium, comprising:

oscillation means coupled to a domain for producing oscillating magnetic fields which couple to said domain causing it to alternately decrease and increase in size, detection means responsive to said domain, said detection means including means coupled to said domain which has a first value in the absence of a domain coupled to said oscillation means and a second value when a domain is coupled to said oscillation means and oscillates in size, indicating means for indicating said first and second values.

6. The apparatus of claim 5, where said oscillation means is a conductor connected to a source of oscillating electrical current.

7. The apparatus of claim 5, where said detection means includes means for producing polarized light which is incident on said magnetic medium and means for receiving said light after it strikes said magnetic medium.

8. The apparatus of claim 5, said detection means including a resonant circuit whose resonant properties are responsive to said first and second values of said means coupled to said domain.

9. The apparatus of claim 8, where said first and second values are values of inductance of an inductive element in said detection means.

10. The apparatus of claim 8, where said first and second values are values of a capacitance in said detection means.

11. An apparatus for detecting magnetic bubble domains in a magnetic medium, comprising:

resonant means having a frequency which is dependent on the presence and absence of an oscillating magnetic domain coupled to said resonant means, and oscillation means for oscillating the size of a magnetic domain coupled thereto, said oscillation means alternately decreasing and increasing the size of said coupled domain.

12. An apparatus for detecting magnetic bubble domains in a magnetic medium, comprising:

resonant means having a voltage amplitude at a terminal thereof which is dependent on the presence and absence of an oscillating magnetic domain coupled to said resonant means, oscillation means for oscillating the size of magnetic domains coupled thereto, causing said domains to alternately decrease and increase in size.

13. An apparatus using magnetic bubble domains which can move in a magnetic medium, comprising:

oscillation means for oscillating the size or shape of a magnetic bubble at a frequency which is greater than the propagation time of said domains when they are moved in said magnetic medium, detection means responsive to said domain oscillation for detecting the presence of a domain being oscillated by said oscillation means.

14. An apparatus using magnetic bubble domains in a magnetic medium, comprising:

oscillation means for oscillating the size or shape of a magnetic bubble domain at a frequency approximately the resonant frequency of said bubble domain in said magnetic medium, and detection means responsive to said domain oscillation for detecting the presence of a domain being oscillated by said oscillation means.

15. An apparatus using magnetic bubble domains in a magnetic medium, comprising:

oscillation means for oscillating the size or shape of a magnetic bubble domain at a frequency of about 1–100 megacycles per second, and detection means responsive to said domain oscillations for detecting the presence of a domain being oscillated by said oscillation means.

* * * * *